United States Patent
Kabalnov et al.

(10) Patent No.: US 8,430,475 B2
(45) Date of Patent: Apr. 30, 2013

(54) INKJET INK AND METHOD OF MAKING THE SAME

(75) Inventors: Alexey S. Kabalnov, San Diego, CA (US); Elizabeth A. Fellner, San Diego, CA (US); David William Jenkins, San Diego, CA (US); Kevin G. Miller, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 13/001,420

(22) PCT Filed: Jun. 25, 2008

(86) PCT No.: PCT/US2008/068248
§ 371 (c)(1),
(2), (4) Date: Mar. 28, 2011

(87) PCT Pub. No.: WO2009/157928
PCT Pub. Date: Dec. 30, 2009

(65) Prior Publication Data
US 2011/0169887 A1   Jul. 14, 2011

(51) Int. Cl.
*B41J 2/015* (2006.01)
*B41J 29/38* (2006.01)
*C09D 1/00* (2006.01)
*C09D 11/00* (2006.01)

(52) U.S. Cl.
USPC ............. 347/20; 347/6; 106/31.6; 106/31.65

(58) Field of Classification Search ............. 347/19–20, 347/6, 44; 106/31.65, 31.6
See application file for complete search history.

(56) References Cited

U.S. PATENT DOCUMENTS

| | | | |
|---|---|---|---|
| 4,193,806 A | 3/1980 | Finlayson | |
| 4,859,247 A | 8/1989 | Foye et al. | |
| 5,288,316 A | 2/1994 | Auslander et al. | |
| 5,290,348 A | 3/1994 | Auslander | |
| 5,474,603 A | 12/1995 | Miyashita et al. | |
| 6,221,138 B1 | 4/2001 | Kenny | |
| 6,224,284 B1 | 5/2001 | Sukhna et al. | |
| 6,261,352 B1 | 7/2001 | Asami | |
| 6,312,510 B1 | 11/2001 | Kamagata et al. | |
| 6,478,862 B1 | 11/2002 | Elwakil | |
| 7,118,620 B2 | 10/2006 | Jayaram | |
| 7,201,792 B2* | 4/2007 | Ikoma et al. ............... | 106/31.58 |

(Continued)

FOREIGN PATENT DOCUMENTS

| | | |
|---|---|---|
| CN | 1321182 | 11/2001 |
| JP | 8134392 | 5/1996 |
| JP | 2006176756 | 7/2006 |
| WO | WO 97/16497 | 5/1997 |
| WO | WO 00/63307 | 10/2000 |

OTHER PUBLICATIONS

International Search Report for Application No. PCT/US2008/068248 dated Mar. 23, 2009 (12 pages).

(Continued)

*Primary Examiner* — Jason Uhlenhake

(57) ABSTRACT

An ink composition comprising a solvent system, a pigment dispersed in the solvent system; and a surfactant present in an amount sufficient to impart to the ink composition a dynamic viscosity greater than 100 centipoise at a shear rate of 1 $s^{-1}$ and a dynamic viscosity from 1 to 10 centipoise at a shear rate of 10,000 $s^{-1}$.

20 Claims, 2 Drawing Sheets

U.S. PATENT DOCUMENTS

| | | |
|---|---|---|
| 2004/0055508 A1 | 3/2004 | Miyamoto et al. |
| 2005/0143486 A1 | 6/2005 | Yoshimura et al. |
| 2005/0228071 A1 | 10/2005 | Vasudevan |
| 2005/0282928 A1 | 12/2005 | Lin et al. |
| 2006/0084720 A1 | 4/2006 | Tyvoll et al. |

OTHER PUBLICATIONS

State Intellectual Property Office, P.R. China, First Office Action for Patent Application No. 200880130003.X issued on Nov. 5, 2012.

* cited by examiner

INKJET INK AND METHOD OF MAKING THE SAME

BACKGROUND

The present disclosure relates generally to the problem of the settling of pigments over time in pigmented inks. This phenomenon leads to pen clogging and poor color consistency in the printed ink.

By increasing the viscosity of the ink, the settling can be decreased. However, increasing the ink viscosity also decreases the rate of pen refill during the ink firing act. This results in a decreased speed of printing.

Pigment particles can be milled to a very small particle diameter, for example, less than 100 nm. This also tends to decrease settling. However, it also tends to worsen light fade and ozone fade when the pigments are inkjet printed on media. Furthermore, certain specialty pigments, such as pearlescent pigments, have to be large in order to show a particular optical effect. In the case of pearlescent pigments, each pigment normally has a flat plate shape comparable in thickness to the wavelength of visible light, ~500 nm, and several micrometers in diameter. This size of the pearlescent pigments combined with their high density of ~3 g/cm$^3$ causes them to quickly settle in typical ink-jet solvents.

If the ink delivery system is designed to constantly mix and re-circulate the pigments in the ink, this somewhat alleviates the problem of settling. However, this is not usually a practical solution and would generally add extra cost to the system.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
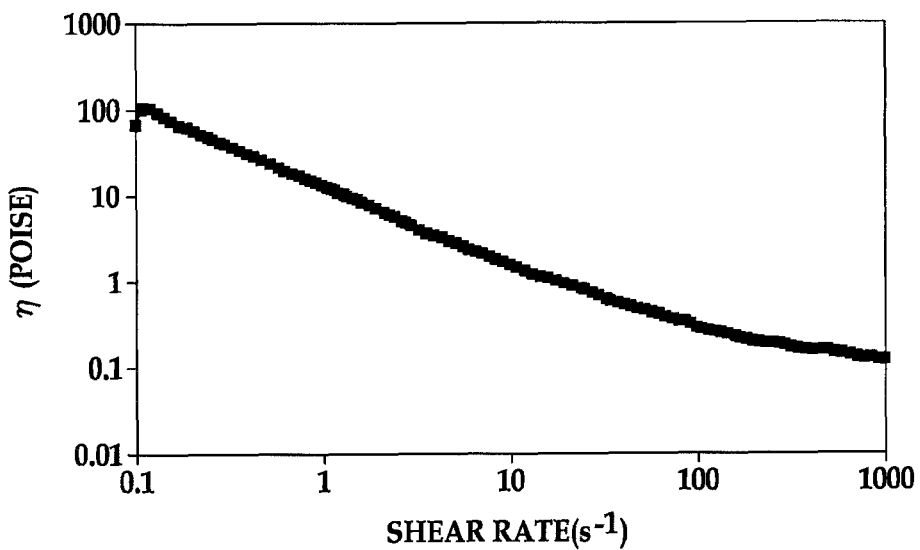
FIG. 1 is a graph showing the dependence of the viscosity on the shear rate in an ink vehicle according to an embodiment of the application.

The present disclosure is a composition, method and system which relates to dispersing ink pigment particles in non-Newtonian liquids.

The relationship of aminoxide surfactants to non-linear viscoelasticity, specifically to the phenomenon of shear-thinning, is discussed in Yuji Yamashita's doctoral dissertation at the University of Bayreuth in Germany, written and published in 2004 (Yamashita, "The Aggregation Behavior of Mixture of Alkylmethylaminoxides with Their Protonated Analogues in Aqueous Solution", Dissertation zur Erlangung des Doktorgrades der Fakultät Biologie, Chemie and Geowissenschaften der Universität Bayreuth, 2004).

In this dissertation, the writer observes that, in a shear thinning, non-Newtonian liquid system, $\eta_{app}$ (the apparent viscosity) decreases with increasing shear rate, and that a minimal yield stress is needed before the non-Newtonian liquid starts to flow. Specifically, in this system, at intermediate shear rates there is a non-linear region where the viscous resistance of the non-Newtonian liquid falls with increasing shear rate. (See Yamashita, page 30, lines 6-8 and 11-13.) Yamashita further states that shear-thinning can be due to flow orientation of the particles in the liquid or the change in conformation of the polymer molecules or elongated micelles in the non-Newtonian liquid. (See Yamashita, page 30, lines 1-3.) In addition, Yamashita makes a connection between the shear thinning phenomenon and alkylmethylaminoxide surfactants. (See Yamashita, pages 21-22 and pages 79-119.)

The present application relates to dispersing ink pigment particles in non-Newtonian liquids which can be used as inks to supply inkjet fluid dispensing systems. A non-Newtonian fluid is one in which viscosity changes with the applied strain rate, resulting in a viscosity which is not well-defined. There is a subgroup of non-Newtonian fluids which show shear thinning. This subgroup is also referred to as pseudoplastic. Shear thinning fluids decrease in viscosity with increasing rate of shear, such as, for example, like a bottle of thick ketchup which drastically decreases in viscosity when it is shaken vigorously. The ink of the present application shows these same shear thinning effects, also referred to as finite yield stress, under the fluid ejection conditions in which ink is moved between the fluid container and the printhead of an inkjet device. Specifically, yield stress is the stress exerted by a force at which a material begins to plastically deform. In a shear thinning liquid which can also be described as exhibiting finite yield stress, the material has only limited ability to resist the force exerted on it, and then its viscosity quickly decreases.

In an aspect of these non-Newtonian inks that is not intuitive to many observers, the dispersed pigments—even large, dense pigments—in such non-Newtonian liquids show little or no settling in the fluid container or printhead during the times when the ink is not moving through the system. When little or no dynamic pressure is being applied to the ink to move it through the system, the ink has an almost "gel-like" consistency that is comparable to the consistency of baby shampoo, such as Johnson's® Baby Shampoo. However, when the normal amount of dynamic pressure (~at least 1000 Pascals) is applied to the ink to move it through the inkjet system, the ink's viscosity changes to something more resembling pure water.

Therefore, when such inks are ejected at a high frequency from the fluid container of an inkjet fluid dispensing device, the dynamic viscosities of the inks are at a low level that does not interfere with the ejection process of the inkjet system. The capillary forces driving the firing chamber refill are large and can overcome the finite yield stress of the ink. At the same time, during the time when the ink is not refilling, settling is either completely prevented or slowed down by several orders of magnitude because the normal shear rates and stresses induced by gravity alone on non-moving individual ink particles are small and cannot break the 'weak gel' of the ink vehicle.

Settling of spherical particles in a non-Newtonian fluid is controlled by the modified Stokes law:

$$V = 0, \frac{4\Delta\rho g R}{3} \leq P_s$$

$$V = \frac{2\Delta\rho g R^2}{9\eta(V)}, \frac{4\Delta\rho g R}{3} > P_s$$

where V is the linear velocity of the particle, Δρ is the density difference between the particle and the medium, g is the gravity acceleration, $P_s$ is the yield stress of the fluid, R is the radius of the particle, and η(V) is the dynamic viscosity as a function of the settling velocity. For a spherical particle of density approximately equal to 10 g/cm$^3$ and a particle diameter of 1 μm, the yield stress needed to keep the particle permanently suspended is ~0.1 Pa. This is much smaller than the capillary pressure that drives the refill of the pen which is approximately 1000 Pa.

As stated above, yield stress is related to the phenomenon of shear thinning. Shear thinning describes a process in which the viscosity decreases when the rate of shear in a given material is increased. The inks containing pigmented materials described above with relation to yield stress exhibit shear thinning.

In the present application, the applicants have developed novel pigmented inks which have low dynamic viscosity and which also have yield stress and/or shear thinning which, though low, affects some of the physical qualities of the ink. Such low but finite yield stress and/or shear thinning imparts certain gel-like qualities to the ink and prevents pigment particles in the ink from settling. Even relatively large pigment particles, such as pearlescent pigments, are prevented from settling by the present system. Furthermore, the yield stress of the ink, within the range it functions in the present application, has little effect on qualities of ink jettability, such as printhead refilling. As a further benefit, the viscosity of the ink can be maintained at low levels. Therefore, the ink functions well in inkjet printing systems.

Based on data collected by the applicants, it is estimated that a spherical pigment particle with a density as high as ~10 g/cm$^3$ and a particle diameter of 1 μm would still stay suspended in an ink having a yield stress of just ~0.1 Pa. In contrast to the above number for ink standing still, the capillary pressure that drives the inkjet printhead firing chamber refill is ~1000 Pa.

Even when the yield stress is not sufficient to keep the particle suspended, the settling rate can be slowed if the vehicle shows a shear thinning effect. Indeed, for a settling particle, the shear rate $$\dot{\gamma} \sim \frac{V}{R}$$

is very small; on the order of 1 Hz. On the other hand, during the firing act the shear rate is high (~10$^3$-10$^4$ Hz). FIG. 1 shows the dependence of the viscosity on the shear rate for one of the shear thinning ink vehicles disclosed in this application. One can see that the viscosity can go down by three orders of magnitude as the shear rate is increased; at about 100-10,000 centipoise during settling (~1-10 Hz) to up to one thousand times lower (1-10 centipoise) at the pen refill frequency (~1000-10,000 Hz).

In another embodiment of the inks, at the shear rate of 10,000 s$^{-1}$, the inks have a dynamic viscosity range from 2 to 5 centipoise. In that same embodiment or in a separate embodiment, at the shear rate of 1 s$^{-1}$, the inks have a dynamic viscosity of greater than 1000 centipoise.

It is possible to have inks with pigmented materials that have yield stress as low as 0 but which still exhibit shear thinning. In that case, where yield stress is 0, settling is slowed down but not completely stopped. In another embodiment, the range of yield stress can be from 0.1 to 10 Pa and serve well as a shear thinning fluid to both prevent settling of ink pigments and allow ink to readily move through the inkjet system at a low viscosity. Thus if the actual measured yield stress in the above-described inks goes as low as 0 Pa in these inks, it is possible to achieve most of the benefits described above because of shear thinning. In contrast, in an ink with pigmented materials in which measurable yield stress exists, the settling can be completely stopped.

Thus, even if the ink of the present application has a yield stress as low as 0 Pa or as high as 1000 Pa, it will serve both to keep pigment particles suspended in the vehicle for a reasonable amount of time and to avoid interfering with the firing chamber refill function.

Therefore, in the inks described herein, when the ink is sitting undisturbed before printing, the viscosity of the ink prevents and/or significantly reduces most settling. When the ink is inkjet printed, a process which causes the shear rate to increase markedly, the viscosity decreases as the shear rate increases. Thus, the ink can be stored for periods of time in the printer without the pigment settling, while when the ink is printed and the printhead refilled, the problems resulting from too much viscosity, such as slow printing, are prevented or are significantly reduced.

In the inks of the present application, any surfactants that are able to generate shear-thinning solutions as a surfactant in solution below 10 weight % can be used. Although many such surfactants exist, a non-limiting list of the most common of the surfactants that can be used is as follows: polyethoxylated alcohols, alkyl-substituted betaine-type surfactants, and alkyl substituted aminoxides. In one embodiment, the surfactant used is oleyldimethylamine oxide.

The present system prevents and/or significantly slows settling of pigments in inkjet inks while still achieving low viscosity of the inks during the printing process. Such a system is especially appropriate for large pigments such as pearlescent pigments which, in some embodiments, can have a particle diameter of from 5 to 10 μm. White pigments, such as those in a non-limiting example made from titania, having a particle diameter of from 0.2 to 0.5 μm and a density of more than 2 g/cm$^3$, also work well in this system.

Metallic pigments, such as aluminum, copper and silver, as non-limiting examples, also work well with this system. In general, metallic particles do not have to be large, in the way that white and pearlescent pigments do, in order to show their metallic finish. As a result, metallic pigments in inkjet inks are often produced in the form of very small particles, e.g. <<100 nm, in order to overcome potential issues with high density and chemical reactivity with water that might otherwise interfere with their inkjettability. Although such metallic pigments are often produced as very small particles, their small size sometimes results in situations in which the color of the ink is affected negatively. For example, very small size silver pigments in an ink can result in a color which is not according to the Pantone color scale and looks more like a mirror than the silver color of traditional silver paint. Furthermore, very small size pigments often have to have careful surface passivation in order to avoid reactivity with water. By allowing the possibility of increasing the metallic particle diameter, the present system allows for the possibility of improving ease of printing and the quality of printed images resulting from metallic pigments in inkjet ink.

The ink vehicle of the presently described system can be used with any pigments normally used in inkjet inks to achieve improved effects. With colored and black pigments which are neither overly large nor small compared to the scale of the largest pearlescent pigments and the smallest metallic pigments, there is a benefit in a system which is tolerant to the presence of occasional large particles in the system. Otherwise, when pigments are used in inkjet inks, substantial effort has to be expended into deep milling and quality control. Indeed, a very small fraction of large particles can cause settling-related (clogging) failures in the printhead.

In one embodiment, the ink vehicle of the present application includes 1-3% surfactant; 10-20% cosolvent; 1-5% colorant, and the balance water.

The surfactant has been observed to form flat and elongated micellar aggregates in water at thermodynamic equilibrium. FIG. 1 is a graph showing the dependence of the viscosity of the ink vehicle on the shear rate. With the ink vehicles made according to this embodiment, the y axis shows the viscosity, and the x axis shows the shear rate. Both were measured at 25° C.

The present application, in a non-limiting embodiment, makes use of a fluid jet dispenser having at least one ink supply in a reservoir or chamber and at least one, and preferably, a plurality of printheads or droplet generators in an array, each head dispensing a fixed volume of fluid in individual droplets from the reservoir on each activation of the printhead or drop generator. This arrangement enables the quantity of ink to be varied.

Figure 2:
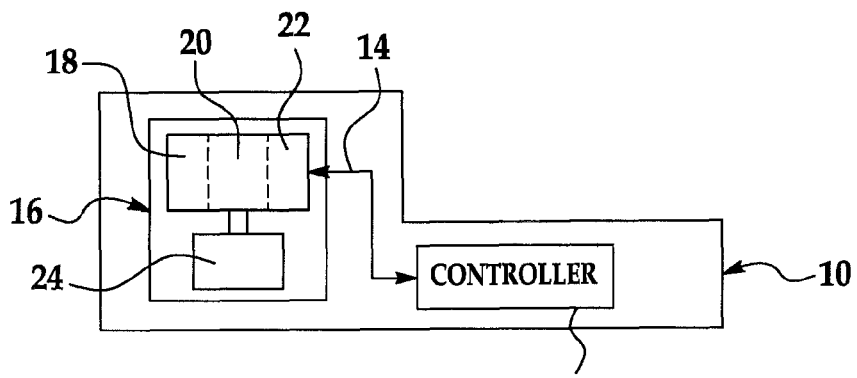
FIG. 2 is a block diagram of a thermal inkjet fluid dispenser according to an embodiment of the application.
Figure 3:
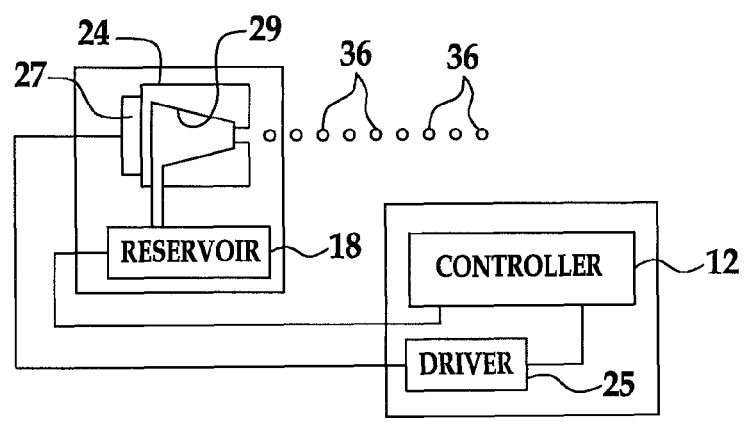
FIG. 3 is a pictorial representation of a piezoelectric inkjet fluid dispenser according to an embodiment of the application.

Referring now to the drawings, and to FIGS. 2 and 3 in particular, there is depicted a fluid dispensing device 10. The device 10 is depicted as a stand-alone apparatus.

The device 10 includes an activating means, such as a controller or control 12, which may be a computer or central processing unit based device operating a control program stored in a memory, not shown. The controller 12 provides output signals 14 to a fluid dispenser 16, as an inkjet based device.

The inkjet fluid dispensing devices used for the present disclosure may be thermal inkjet (TIJ) devices, which, as a non-limiting example may incorporate control and structural features of a Hewlett-Packard Ink-jet Printer, HP Photosmart Pro 9180. These include at least one fluid reservoir 18. By way of example only, multiple reservoirs 20 and 22 can also be provided in the fluid dispenser 16. Each reservoir 18, 20, 22 may contain the same or different fluids. Alternately, a single reservoir can contain a plurality of separate compartments.

As is well known, such fluid dispenser 16 includes at least one fluid drop generator or inkjet printhead for each reservoir 18, 20, and 22. Preferably, an array 24 is provided with a plurality of heads or droplet generators divided into subgroups, with each subgroup containing a plurality of heads associated with one specific reservoir 18, 20 or 22.

The fluid dispenser 16 is a drop on demand type fluid dispenser, with piezoelectric or thermal fluid drop generators being preferred. Piezoelectric inks can have vehicles that are either aqueous or non-aqueous. Thermal inkjet inks can have vehicles that are aqueous. FIG. 3 depicts a block diagram of a typical piezoelectric fluid drop generator 24 which is capable of dispensing individual droplets 36 upon each activation of a driver 25.

The piezoelectric driver 25 operating under control signals from the controller 12 supplies activating signals to a disk or layer of piezoelectric material 27 which is mechanically connected to a chamber 29 in one inkjet printhead 24. The chamber 29 is disposed in fluid communication with one of the reservoirs, such as reservoir 18, whereby capillary action supplies fluid from the reservoir 18 to the chamber 29. Upon each activation of the driver 25, the piezoelectric material 27 undergoes stress which results in mechanical movement of the piezoelectric material or element 27 resulting in a pumping action within the chamber 29 which expels individual droplets 36 through an orifice or outlet 33 in the inkjet printhead 24.

To further illustrate embodiment(s) of the present disclosure, examples are given herein. It is to be understood that these examples are provided for illustrative purposes and are not to be construed as limiting the scope of the disclosed embodiment(s).

EXAMPLES

Example 1

The following inks were formulated as described in Table 1:

TABLE 1

Weight Percentage of Components in the Inks

| Component | Ink#1 | Ink#2 | Ink#3 | Ink#4 | Ink#5 | Ink#6 | Ink#7 |
|---|---|---|---|---|---|---|---|
| Glycerol | 10 | 10 | 10 | 10 | 10 | 10 | 10 |
| Betaine | 10 | 10 | 10 | 10 | 10 | 10 | 10 |
| Oleyldiemethylamine oxide (per dry weight) | 0.2 | 0.9 | 1.5 | — | 0.2 | 0.9 | 1.5 |
| Magnapearl 3100, dry powder | 0.5 | 0.5 | 0.5 | 0.5 | 2 | 2 | 2 |
| Joncryl 683 | — | — | — | 2 | — | — | — |
| Surfynol 440 | — | — | — | 0.2 | — | — | — |
| Zonyl FSO | — | — | — | 0.2 | — | — | — |
| Water | Balance | Balance | Balance | Balance | Balance | Balance | Balance |

Figure 4:
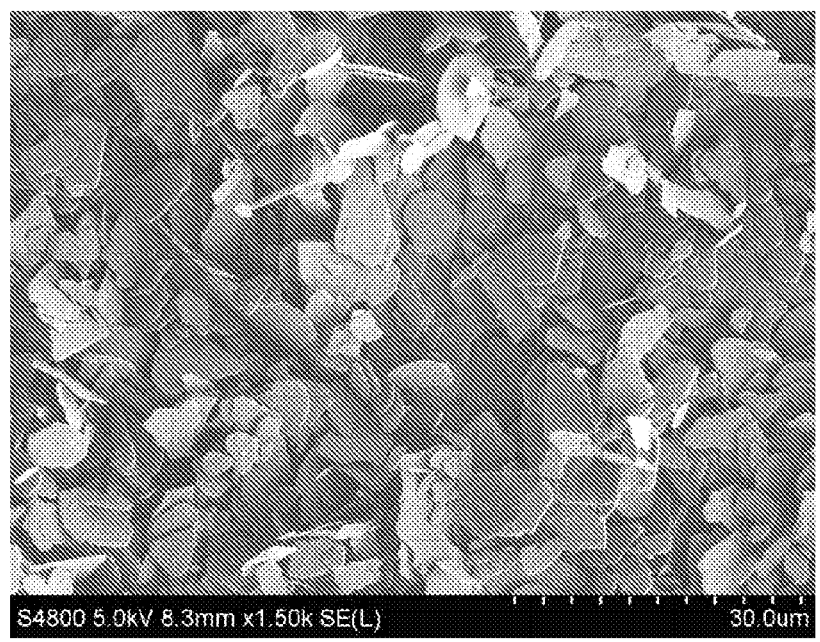
FIG. 4 is an electron microscopic plate showing a pearlescent pigment at 1500× magnification in an embodiment of the application.

The inks contained a pearlescent pigment (Magnapearl) manufactured by BASF. The pigment was composed of flat mica particles covered by titania. The particle diameter was about 5-10 µm, as measured by optical microscopy and the density is estimated at ~3 g/cm$^3$. FIG. 4 shows a scanning electron microscope (SEM) image of particles of pearlescent pigment. Oleyldimethylamine oxide (OOAO) (Henkel) was supplied as a 30% solution in water (the percentage as expressed in Table 1 was dry weight). The inks were prepared by mixing the components using Ultra-Torrax mixer (IKA- Werke) for 5 minutes. Ink #4 was a control with a traditional ink vehicle that did not have viscoelastic properties. Rather it had acrylic polymer as a stabilizer. In contrast, inks # 1, 2, 3, 5, 6 and 7 had increasing levels of OOAO surfactant and increasing levels of viscoelasticity. Inks # 1-3 were lower in pigment load than Inks # 5-7.

The inks were evaluated for jettability and settling. Settling was evaluated visually by looking for the precipitate at the bottom of the ink bottles after 2 days of standing at ambient conditions. The inks were used in a printhead similar to the one used in HP Photosmart Pro 9180, with the nominal drop weight of 14 ng. Jettability was evaluated by following the jet formation at increased frequencies, and determining the maximum frequency at which the jet formation becomes unstable. The temperature was set to 55° C. Table 2 compares jettability and settling stability of Ink #1-Ink #7.

TABLE 2

Settling and Jettability of Inks # 1-7

| Ink | Settling | Jettability Frequency Limit, kHz |
|---|---|---|
| 1 | Some | 12 |
| 2 | No | 9 |
| 3 | No | 8 |
| 4 | Yes | 22 |
| 5 | Some | 12 |
| 6 | No | 3 |
| 7 | No | 3 |

Figure 5:
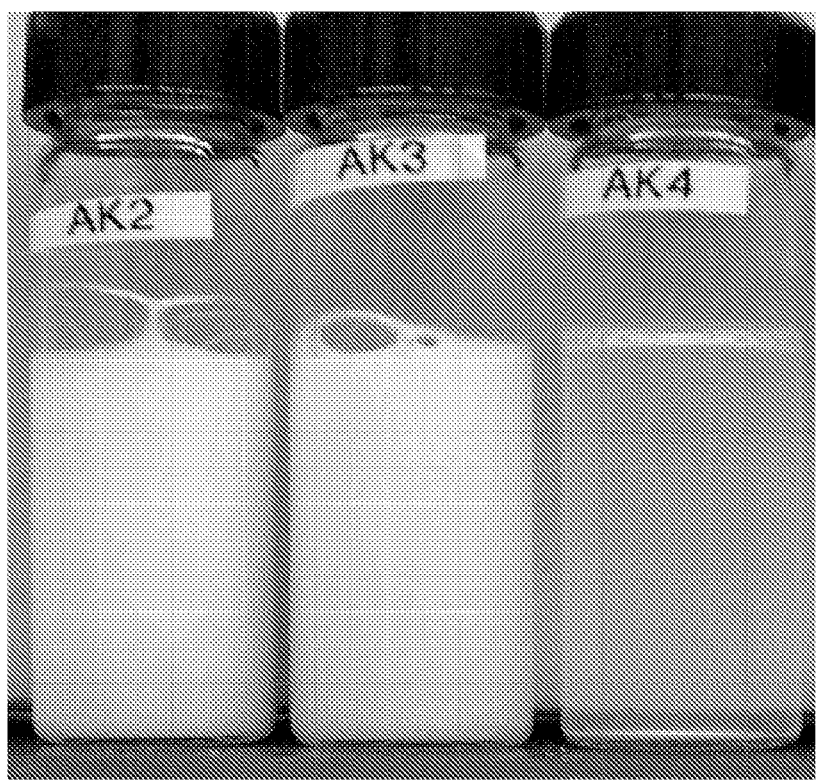
FIG. 5 shows three bottles with pearlescent pigment particles dispersed in different ink vehicles.

FIG. 5 is a photograph of the inks # 2, 3 and 4 20 hours after hand-mixing. The control ink # 4 had by that time fully settled. Inks #1 and #5 (not depicted in the photograph) showed some settling, while inks # 2, 3, 6 and 7 (# 6 and #7 also not depicted in the photograph) showed no settling.

Example 2

Ink # 2 as described in Example 1 was filled into a 6 ng inkjet printhead similar to the printhead architecture used for a Magenta-Yellow printhead in HP Photosmart Pro B9180. The ink ejection was observed using a strobe microscope system. Stable jets were formed at the trickle warming temperature of 60° C. Such jets were stable up to a frequency of about 12 kHz with no firing chamber refill issues. The inks were then printed from the B9180 printer on HP Advanced Photo Paper. The pearlescent effect continued to be observed.

The large pigment size tested in these examples would be more suited for a higher drop weight (>20 ng) inkjet printhead than was tested. Performance in the 6 ng range was good but could be improved even more at high dropweight conditions.

Example 3

The following white inks shown in Table 3 were prepared by using an Ultra-Torrax homogenizer, as described in the previous example.

TABLE 3

Formulations of White Inks

| Ink code name | AK25 | AK26 | AK27 | AK28 | AK29 | AK30 | AK31 | AK32 |
|---|---|---|---|---|---|---|---|---|
| Oleyldimethylamine oxide (Henkel) | 1.4 | 1.4 | 1.4 | 1.4 | 1.4 | 1.4 | 1.4 | 1.4 |
| TI-PURE Titania powder (DuPont) | 3.6 | 3.6 | 3.6 | 3.6 | 3.6 | 3.6 | 3.6 | 3.6 |
| Betaine | 10 | | | | | | | |
| Glycerol | | 10 | | | | | | |
| Diethylene glycol | | | 10 | | | | | |
| LEG-7 (Liponics) | | | | 10 | | | | |
| Triethylene glycol | | | | | 10 | | | |
| PEG 600 | | | | | | 10 | | |
| 2-pyrrolidone | | | | | | | 10 | |
| Triethanolamine | | | | | | | | 10 |
| Water | Balance | Balance | Balance | Balance | Balance | Balance | Balance | Balance |

The inks were used to fill in a printhead similar to the one used in HP Photosmart Pro 9180, with the nominal drop weight of 14 ng. The inks were evaluated for jettability and settling. Settling was evaluated visually by looking for the precipitate at the bottom of the ink bottles after 2 weeks of standing at ambient conditions. Jettability was evaluated by following the jet formation at increased frequencies, and determining the maximum frequency at which the jet formation becomes unstable.

From Table 4 below, one can see that some of the inks can be jetted and also show a substantial reduction in settling. It was observed that inks that did not contain oleyldimethylamine oxide showed visible settling after one day.

Similarly, from Table 4 it can be seen that some of the co-solvents in the ink vehicle may weaken or completely eliminate viscoelastic properties of oleyldimethylamine oxide, and thereby eliminate settling prevention. Therefore, only some surfactant-co-solvent combinations can be efficient for the purpose of embodiment(s) of the present disclosure.

TABLE 4

Jettability and settling of white inks described in Table 2

| Ink | Settling | Jettability |
|---|---|---|
| AK25 | No | Up to 9 kHz |
| AK26 | Some | No |
| AK27 | No | Up to 3 kHz |
| AK28 | No | Up to 9 kHz |
| AK29 | Yes | Up to 12 kHz |
| AK30 | No | Up to 5 kHz |
| AK31 | Yes | Up to 5 kHz |
| AK32 | Yes | Up to 15 kHz |

For the proposition that some solvents may be more beneficial for the settling prevention, while some others may be more beneficial for jettability, several mixed solvent systems were tried in the formulations shown in Table 5.

TABLE 5

Formulations of white inks with mixed solvents

| | Ink code name | | | |
|---|---|---|---|---|
| | AK33 | AK34 | AK35 | AK36 |
| Oleyldimethyl amine oxide (Henkel) | 1.4 | 1.4 | 1.4 | 1.4 |
| TI-PURE Titania powder (DuPont) | 3.6 | 3.6 | 3.6 | 3.6 |
| Betaine | 3.3 | 5 | 6.7 | 5 |
| LEG-7 (Liponics) | | | | 5 |
| 2-pyrrolidone | 6.7 | 5 | 3.3 | |
| Water | Balance | Balance | Balance | Balance |

Table 6 below compares the settling and jettability for AK33-AK36, the formulations which were shown in Table 5.

TABLE 6

Jettability and stability to settling of white inks described in Table 4

| Ink | Settling | Jettability frequency limit, kHz |
|---|---|---|
| AK33 | No | 20 |
| AK34 | No | 9 |
| AK35 | No | 18 |
| AK36 | No | 20 |

As can be seen from Tables 5 and 6, both 2-pyrrolidone-betaine and LEG-betaine systems showed better jettability than when present by themselves, without compromising settling prevention.

While several embodiments have been described in detail, it will be apparent to those skilled in the art that the disclosed embodiments may be modified. Therefore, the foregoing description is to be considered exemplary rather than limiting.

What is claimed is:

1. An inkjet ink, comprising:
    a solvent system;
    a pigment dispersed in the solvent system having a particle diameter of at least 0.2 µm and a density of at least 2 g/cm$^3$; and
    a surfactant comprising at least one of polyethoxylated alcohols, alkyl-substituted betaine-type surfactants, and alkyl-substituted aminoxides, the surfactants being present in an amount less than 30 weight percent, the amount being sufficient to impart to the ink a viscosity that decreases as shear rate increases, such that the ink has a dynamic viscosity greater than 100 centipoise at a shear rate of 1 s$^{-1}$ and a dynamic viscosity from 1 to 10 centipoise at a shear rate of 10,000 s$^{-1}$.

2. The inkjet ink of claim 1 wherein the surfactant is present in an amount sufficient to achieve a yield stress less than 1000 Pascals.

3. The inkjet ink of claim 1 wherein the surfactant is present in an amount sufficient to achieve a yield stress ranging from about 0.1 to about 10 Pascals.

4. The inkjet ink of claim 1 wherein the ink has a dynamic viscosity from 2 to 5 centipoise at a shear rate of 10,000 s$^{-1}$.

5. The inkjet ink of claim 1 wherein the ink has a dynamic viscosity greater than 1000 centipoise at a shear rate of 1 s$^{-1}$.

6. The inkjet ink of claim 1 wherein the surfactant in the ink is below 10 weight percent.

7. The inkjet ink of claim 1 wherein the surfactant is oleyldimethylamine oxide.

8. The inkjet ink of claim 1 wherein the pigment is selected from the group consisting of black pigments, colored pigments, white pigments, metallic pigments, and pearlescent pigments.

9. The inkjet ink of claim 1 wherein the pigment is a white pigment and has a particle diameter of from 0.2 to 0.5 µm.

10. The inkjet ink of claim 9 wherein the white pigment is titania.

11. The inkjet ink of claim 1 wherein the pigment is a pearlescent pigment and has a particle diameter of from 5 to 10 µm.

12. A method of printing an inkjet ink having viscoelasticity-producing surfactants, the method comprising:
    activating an inkjet printhead to eject an inkjet ink including:
        a solvent system;
        a pigment dispersed in the solvent system having a particle diameter of at least 0.2 µm and a density of at least 2 g/cm$^3$; and
        a surfactant comprising at least one of polyethoxylated alcohols, alkyl-substituted betaine-type surfactants, and alkyl-substituted aminoxides, the surfactants being present in an amount less than 30 weight percent, the amount being sufficient to impart to the ink a viscosity that decreases as shear rate increases, such that the ink has a dynamic viscosity greater than 100 centipoise at a shear rate of 1 s$^{-1}$ and a dynamic viscosity from 1 to 10 centipoise at a shear rate of 10,000 s$^{-1}$.

13. The method of claim 12, further comprising establishing fluid communication between the inkjet printhead and an ink supply reservoir through a fluid conduit.

14. The method of claim 12, further comprising an ink reservoir integrally formed in an inkjet cartridge, the ink reservoir in fluid communication with the inkjet printhead.

15. The method of claim 12 wherein the surfactant is present in an amount sufficient to achieve a yield stress less than 1000 Pascals.

16. The method of claim 12 wherein the ink has a dynamic viscosity from 2 to 5 centipoise at a shear rate of 10,000 s$^{-1}$.

17. The method of claim 12 wherein the surfactant in the ink is below 10 weight percent, and wherein the surfactant is oleyldimethylamine oxide.

18. The method of claim 12 wherein the inkjet printhead comprises a greater than 20 ng drop weight inkjet printhead.

19. A system for preventing pigment settling in inkjet inks, comprising:
    an inkjet ink, the ink including:
        a solvent system;
        a pigment dispersed in the solvent system having a particle diameter of at least 0.2 µm and a density of at least 2 g/cm$^3$; and
        a surfactant comprising at least one of polyethoxylated alcohols, alkyl-substituted betaine-type surfactants, and alkyl-substituted aminoxides, the surfactants being present in an amount less than 30 weight percent, the amount being sufficient to impart to the ink a viscosity that decreases as shear rate increases, such that the ink has a dynamic viscosity greater than 100 centipoise at a shear rate of 1 s$^{-1}$ and a dynamic viscosity from 1 to 10 centipoise at a shear rate of 10,000 s$^{-1}$; and
    a reservoir for containing the inkjet ink, the reservoir configured for fluid communication with an inkjet printhead, the inkjet printhead having at least one fluid ejector disposed thereon.

20. The system of claim 19 wherein:

the surfactant is present in an amount sufficient to achieve a yield stress less than 1000 Pascals; and the ink has a dynamic viscosity from 2 to 5 centipoise at a shear rate of 10,000 s$^{-1}$.

* * * * *